United States Patent
Mehra et al.

(10) Patent No.: US 10,809,940 B1
(45) Date of Patent: Oct. 20, 2020

(54) MULTILEVEL RESILIENCY

(71) Applicant: Microsoft Technology Licensing, LLC, Redmond, WA (US)

(72) Inventors: Karan Mehra, Sammamish, WA (US); Justin Sing Tong Cheung, Redmond, WA (US); Vinod R. Shankar, Redmond, WA (US); Grigory Borisovich Lyakhovitskiy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/389,605

(22) Filed: Apr. 19, 2019

(51) Int. Cl.
*G06F 3/06* (2006.01)

(52) U.S. Cl.
CPC ............ *G06F 3/065* (2013.01); *G06F 3/067* (2013.01); *G06F 3/0617* (2013.01)

(58) Field of Classification Search
CPC ......... G06F 3/0617; G06F 3/065; G06F 3/067
See application file for complete search history.

(56) References Cited

U.S. PATENT DOCUMENTS

| | | | |
|---|---|---|---|
| 5,742,792 A * | 4/1998 | Yanai | G06F 3/0601 711/162 |
| 2012/0089778 A1 | 4/2012 | Au et al. | |
| 2016/0011804 A1 * | 1/2016 | Law | H04L 67/1097 711/114 |
| 2018/0143773 A1 | 5/2018 | Zhang et al. | |

FOREIGN PATENT DOCUMENTS

| | | |
|---|---|---|
| EP | 2703991 A2 | 3/2014 |
| WO | 2016023005 A1 | 2/2016 |

OTHER PUBLICATIONS

Patterson. et al., A Case for Redundant Arrays of Inexpensive Disks (RAID), Dec. 1987 (Year: 1987).*
"International Search Report and Written Opinion Issued in PCT Application No. PCT/US2020/025614", dated Jul. 21, 2020, 16 Pages.

* cited by examiner

*Primary Examiner* — Larry T Mackall

(74) *Attorney, Agent, or Firm* — Newport IP, LLC; Han Gim

(57) ABSTRACT

A first storage node configured to store data associated with a user is allocated. The data stored on the first storage node is mirrored at a second storage node. A resiliency mechanism is implemented at the first and second storage nodes. The resiliency mechanism is configured to restore data on at least one of the storage devices of the first and second storage nodes. In response to a loss of availability of either the first or second storage node and a loss of availability of one or more storage device on an available storage node, data on the unavailable storage devices of the available storage node is recovered using the resiliency mechanism of the available storage node.

20 Claims, 12 Drawing Sheets

MULTILEVEL RESILIENCY

BACKGROUND

Data storage devices are susceptible to physical failures, and fault tolerant techniques can be employed to avoid or minimize the impact of such failures. In some examples, physical disk drive components may be combined into one or more logical units to provide data redundancy and performance improvement. Data may also be distributed across the drives depending on the desired level of redundancy, performance, reliability, availability, and capacity. Different levels of resiliency can be achieved, for example, by different mirroring schemes or parity schemes.

Mirroring is the replication of data that comprise logical disk volumes to provide redundancy. A mirrored volume may be a logical representation of separate volume copies. Resiliency can be achieved by a mirroring scheme that maintains two copies of data, where the different copies are on one or more different device arrangements. More resiliency can be achieved by having three copies of data on three different device arrangements. The first example can tolerate a single device failure while the second example could tolerate two device failures.

Alternatively, various parity schemes can be used to achieve resiliency. In some examples, a parity drive may be implemented to provide resilience/redundancy. One way to implement parity is to use the exclusive (XOR) operation. In such an implementation, the XOR may be performed for data to be backed, and the XOR may be written to the parity drive/volume. If a drive fails, the XOR of the remaining drive and the parity drive can be taken to recover the data on the failed drive. Parity schemes use less disk space than triple mirroring schemes, but may have lower levels of performance because of the need to perform the parity function, as well as other administrative tasks.

It is with respect to these and other considerations that the disclosure made herein is presented. The subject matter claimed herein is not limited to embodiments that solve any disadvantages or that operate only in environments such as those described above. Rather, this background is only provided to illustrate one exemplary technology area where some embodiments described herein may be practiced.

SUMMARY

It is desirable to provide the highest level of data storage resiliency for handling faults such as power interruptions, while at the same time providing performance and minimizing cost. Two examples of a resiliency mechanism are a mirroring scheme and a parity scheme. The techniques disclosed herein provide for improvements in the uptime provided by resiliency schemes such as mirroring and parity. The improvements include improved data resiliency, while at the same time providing performance and minimizing cost.

Users of data storage services typically implement two or more storage nodes for resiliency, where a node may be a grouping of storage devices. For example, a user may implement two nodes that are mirrored for resiliency. Each node may have a number of storage devices. In some cases, a node may be taken off line for maintenance. However, during such a time, the user will not be able to tolerate any failures of a storage device in the active node, which can result in data loss.

In an embodiment, multilevel resiliency may be implemented to enable the user's storage nodes to tolerate an additional storage device failure even after there are no mirrored nodes available. In one embodiment, each mirrored node may in turn implement a parity scheme to enable an additional layer of resiliency within the node. In this way, a failure of a device within the node will not result in loss of data when the mirrored copy of the node is not available.

As used herein, a node may be a grouping of storage devices for a fault domain. A node may be mirrored to provide resiliency at the node level. More generally, a node may be mirrored so that there are a total of N copies of a node. In this case, N–1 failures may be tolerated at the node level. Once N–1 failures have occurred, the remaining node may recover from an additional storage device fault based on the additional resiliency scheme implemented within the node. In some embodiments, a node may implement parity to provide resiliency within the node. In other embodiments, the node may implement mirroring to provide resiliency within the node. Other resiliency schemes may also be implemented.

In some embodiments, a multilevel resiliency scheme may be managed using metadata that tracks the mirroring or parity as data is being written and modified. The metadata may be stored in mirrored metadata drives to ensure integrity and resiliency of the data. However, over time some of the metadata drives may fail. A resiliency scheme may therefore be implemented for the metadata drives to enable integrity of the metadata.

In one embodiment, a quorum may be defined as the minimum number of votes from metadata drives (which may be referred to as metadata voters) that are needed to ensure integrity of the metadata. For example, if there are ten metadata voters, then six metadata voters may be defined as the quorum. If there is a stalemate in which five metadata voters vote one way and five metadata voters vote the other way (e.g., the vote is split 50/50), in some embodiments a node witness may be consulted to break the tie. The node witness may be an additional voter that has witnessed the transaction and can vouch for the integrity of the metadata. The node witness may be a trusted copy of the metadata on a data store that may be used to re-establish the quorum. The vote of the witness can thus be used to maintain a majority or a quorum. For performance reasons, the node witness may be engaged only when 50% of the metadata voters are incapacitated. The node witness witnesses the transaction so that the metadata can be authenticated in the future if the vote is split 50/50 among all metadata voters.

In some embodiments, the operation of the quorum may be redefined to allow for the metadata to be trusted even when the number of valid metadata voters falls below 50%. As long as the node witness was present to witness a transaction, the metadata reported by the witness may be considered to be valid. To ensure that the witness's recollection of events is valid when the total number of metadata voters dips below 50%, the witness may be engaged earlier. In one embodiment, a range of numbers of metadata voters may be used to trigger an activation of the witness. For example, if there are six metadata voters, normally four or more metadata voters would be needed to establish a quorum. In an embodiment, the witness may be invoked when the number of metadata voters reaches 4 so that the metadata reported by the witness is still valid until the number of metadata voters reaches 2. Thus, by the time two or three metadata voters is reached, the witness may be synchronized with a reliable copy of the metadata. More generally, the desired number of metadata voters can be 50% plus the number of metadata voter failures that are to be absorbed.

This can be determined as the number of node failures plus the number of additional drive failures that are to be absorbed The overall resiliency of a storage network can thus be increased by using a multilevel resiliency for the stored data, and by using a witness to maintain integrity of the metadata.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
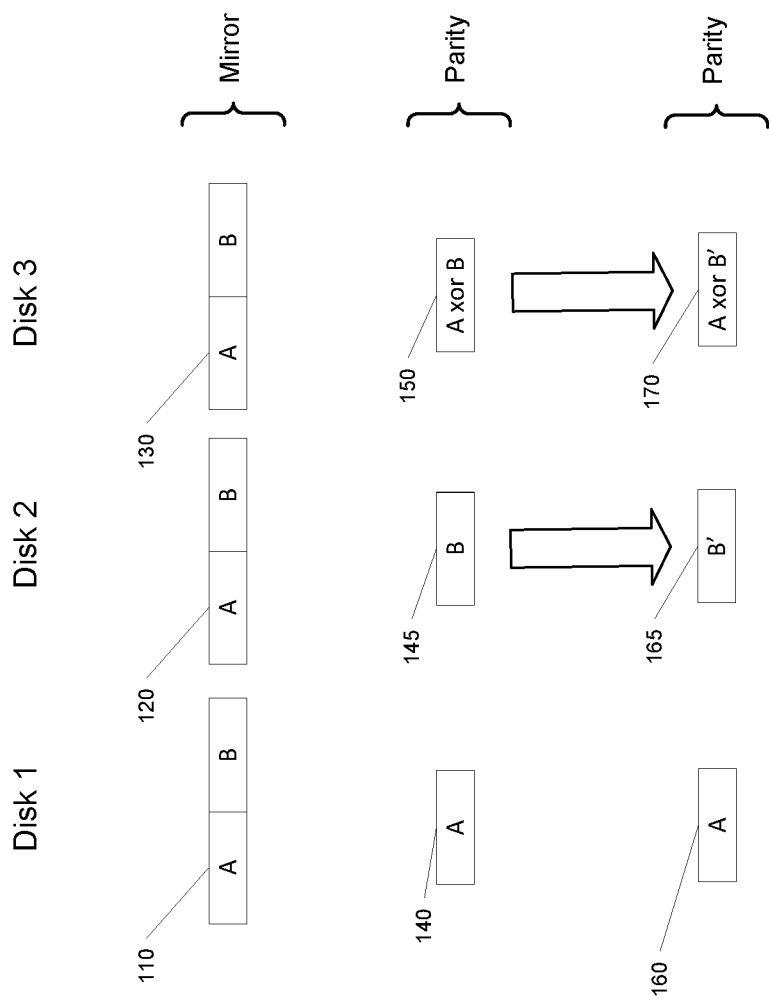
FIG. 1 is a diagram illustrating example resiliency schemes.

The techniques disclosed herein provide for improvements in the implementation of data resiliency schemes such as mirroring and parity. Many users want the highest level of resiliency when hosting their data, while at the same time providing performance and minimizing cost. Referring to FIG. 1, illustrated are examples of a mirroring scheme and a parity scheme which may be implemented to provide resiliency. Two data blocks A and B are shown initially as data group 110 that may be stored on disk 1. For mirroring with two backups, data blocks A and B are shown replicated as data groups 120 and 130 on disk 2 and disk 3, respectively. In a parity scheme, data blocks A 140 and B 145 are shown on disks 1 and 2, and backed by XOR'ing the data and saved as parity 150. When data B is updated to data B', then the parity is updated by XOR'ing the updated data B and stored as updated parity data 170. It should be noted that the described examples may be implemented in a variety of applicable parity schemes and are not limited to the specific examples described herein. For example, both RAID5 and RAID6 are example scenarios where the described embodiments may be implemented.

In some examples, users may implement two or more nodes for resiliency, where a node may be a grouping of storage volumes. For example, a user may implement two nodes that are mirrored for resiliency, where a mirrored copy of the data is maintained in the second node. Each node may have a number of storage devices, such as three disks. Such a resiliency scheme may be referred to as a resiliency layout. In some cases, a node may need to be taken off line for maintenance. However, during such a time, the user will not be able to tolerate any failures of any storage device in the active node.

In an embodiment, multilevel resiliency may be implemented to enable a resiliency layout that can tolerate an additional storage device failure when only one node is active. In one embodiment, each mirrored node may implement a parity scheme to enable an additional layer of resiliency within each node. In this way, a failure of a storage device within the node will not result in loss of data when mirrored copies of the node are not available.

As used herein, a node may be a grouping of storage devices for a fault domain. A node may be mirrored to provide resiliency at the node level. More generally, a node may be mirrored so that there are a total of N copies of a node. In this case, N−1 failures may be tolerated at the node level. Once N−1 failures have occurred, the remaining node may retain data integrity even with an additional fault of a storage device within the node based on the additional resiliency scheme implemented within the node.

In some embodiments, a node may implement a parity-based resiliency scheme to provide resiliency within the node. In other embodiments, the node may implement a mirroring scheme to provide resiliency within the node. Other resiliency schemes may be implemented within the node. As used herein, such a resiliency scheme may also be referred to as a resiliency function or resiliency mechanism.

Figure 2:
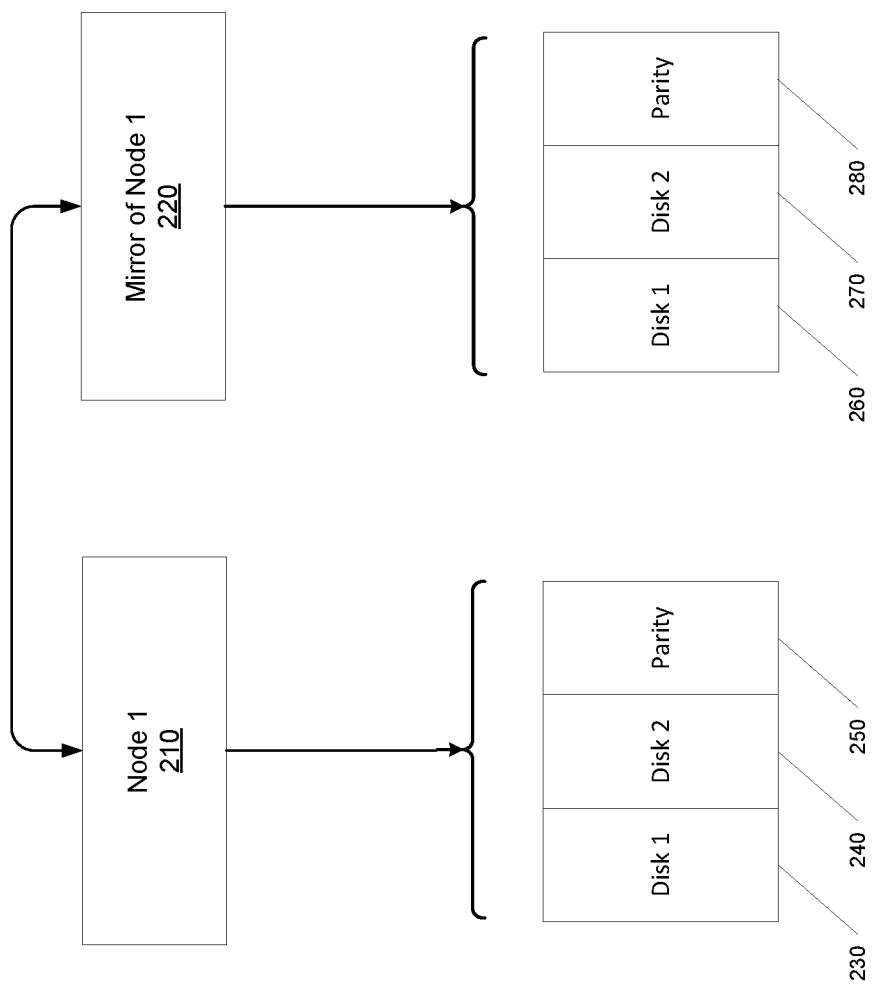
FIG. 2 is a diagram illustrating an example of a multilevel resiliency scheme, according to the described implementations.

Referring to FIG. 2, illustrated is an example of multilevel resiliency that may be implemented to enable a resiliency layout that can tolerate an additional storage volume failure when only one node is active. Referring to the figure, node 1 210 is mirrored by mirror 220. Node 210 may include disk 230 and 240 which may be backed by parity 250 to enable an additional layer of resiliency within the node. In this way, a failure of either disk 1 230, disk 2 240, or parity 250 will not result in loss of data. In an embodiment, the mirror 220 may maintain a copy of disk 1 260, copy of disk 2 270, and copy of parity 280.

Figure 3:
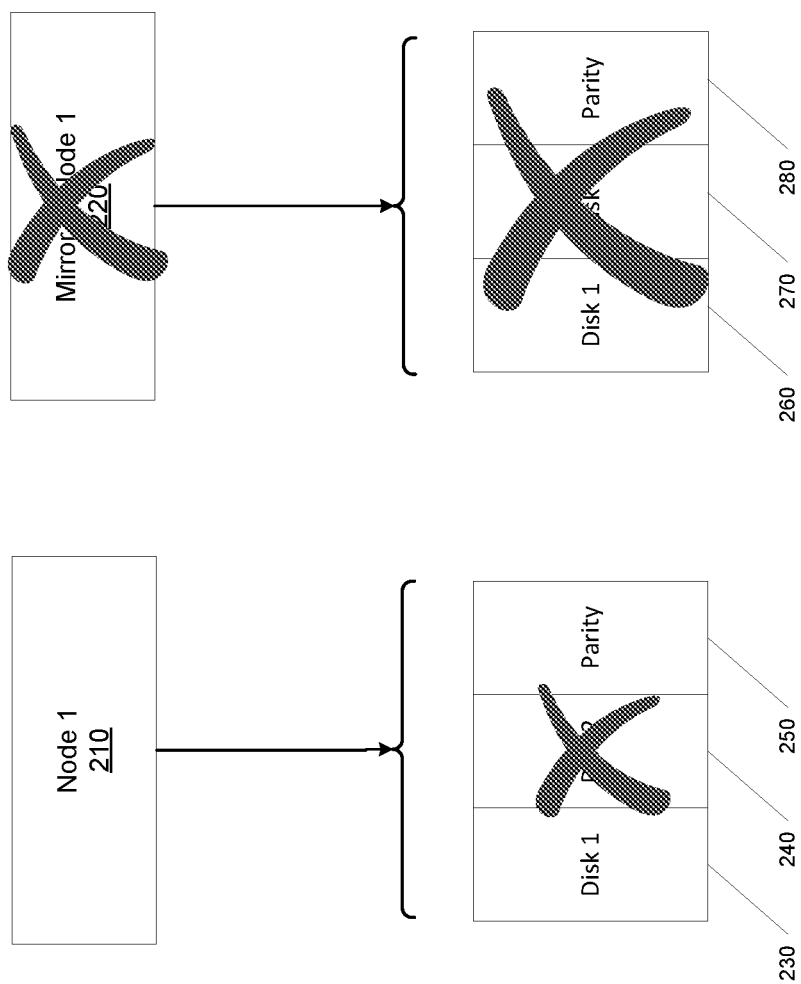
FIG. 3 is a diagram illustrating an example of a multilevel resiliency scheme, according to the described implementations.

Referring to FIG. 3, illustrated is a scenario where the mirrored node 220 is brought offline or has experienced a failure that causes the node to cease being able to mirror the primary node 210. In this case, node 1 210 would normally not have a resiliency capability. However, since node 1 210 has a parity backup 250 for its two disks 230 and 240, node 1 210 can recover from loss of one of the two disks 230 and 240. As shown in the example in FIG. 3, disk 2 240 has failed. However, since parity 250 has not failed, the contents of disk 2 240 may be recovered by X'ORing disk 1 230 and parity 250. This is illustrated in FIG. 4, which shows X'ORing disk 1 230 and parity 250 to recover the contents of disk 2 240.

Figure 4:
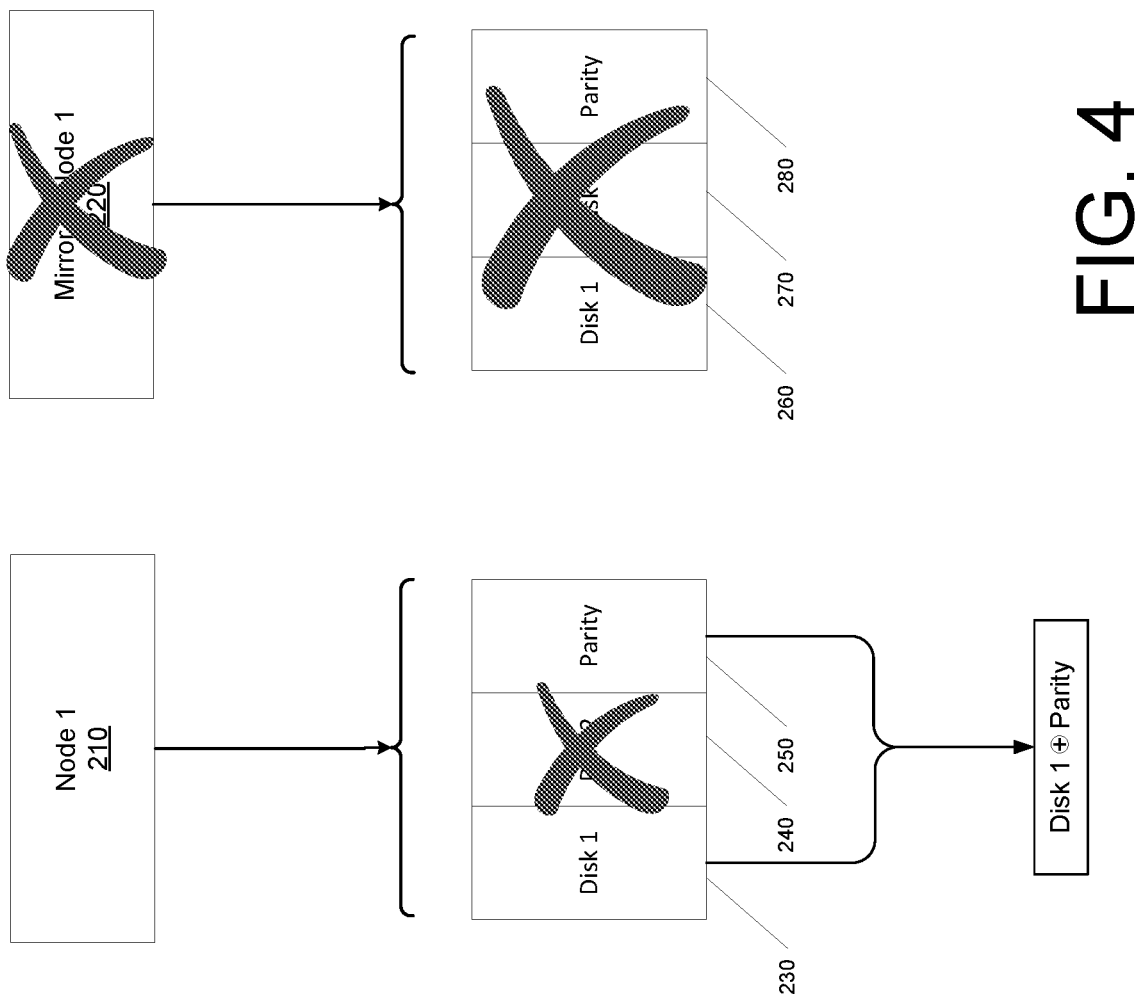
FIG. 4 is a diagram illustrating an example of a multilevel resiliency scheme, according to the described implementations.

While FIGS. 2-4 depict the implementation of multilevel resiliency in a scenario with one mirrored copy and a parity of two disks within each node, the principles may be applied to multiple mirrored copies of nodes and resiliency schemes for multiple disks within each node. Additionally, multiple levels of resiliency may be implemented at the node level or within the node. For example, a storage device within a node may be mirrored, and further, storage areas within the device may implement an additional resiliency mechanism. At the node level, a group of mirrored nodes may itself be mirrored so that resiliency can be implemented for clusters of nodes.

Figure 5:
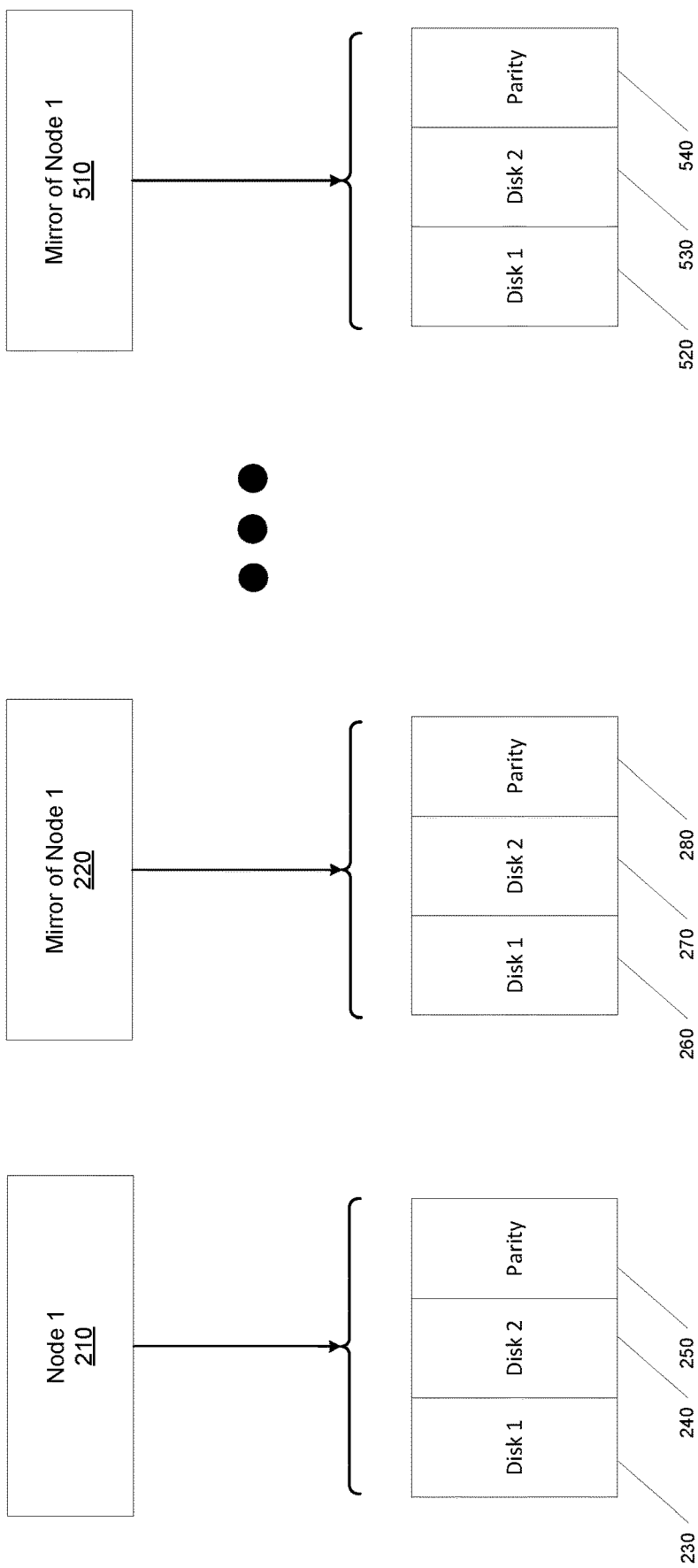
FIG. 5 is a diagram illustrating an example of a multilevel resiliency scheme, according to the described implementations.

In the example depicted in FIG. 5, additional mirrored copies 510 may be part of the resiliency scheme, and each mirrored copy in turn may have an additional layer of resiliency such as disk 1 520, disk 2, 530, and parity 540. In one example, four nodes may be implemented to provide a four-way mirroring scheme (one original and three copies). Within each node, a mirroring or parity scheme can be implemented to provide at least the ability to recover from the loss of a storage device within the node.

A storage resiliency scheme may be tracked and managed using metadata that can be used to track and manage the mirroring or parity scheme and storage layout as data is being written and modified. The metadata may be stored in metadata data stores that typically implement their own resiliency schemes to ensure integrity and resiliency of the stored data, for example by mirroring copies of the metadata.

In one embodiment, a minimum number of votes by the metadata copies (which may be referred to as metadata voters) that are needed to continue operation may be defined as a quorum. A quorum may be defined as the minimum number of metadata voters that are needed to provide integrity of the metadata. For example, if there are ten metadata voters, six metadata voters may be defined as the quorum. If there is a stalemate in which five metadata voters vote one way and five metadata voters vote the other way (e.g., the vote is split 50/50), in some embodiments a node witness may be consulted to break the tie. The node witness may be a trusted copy of the metadata on a data store that may be used to form a majority or can be used as a tiebreaker.

Figure 6:
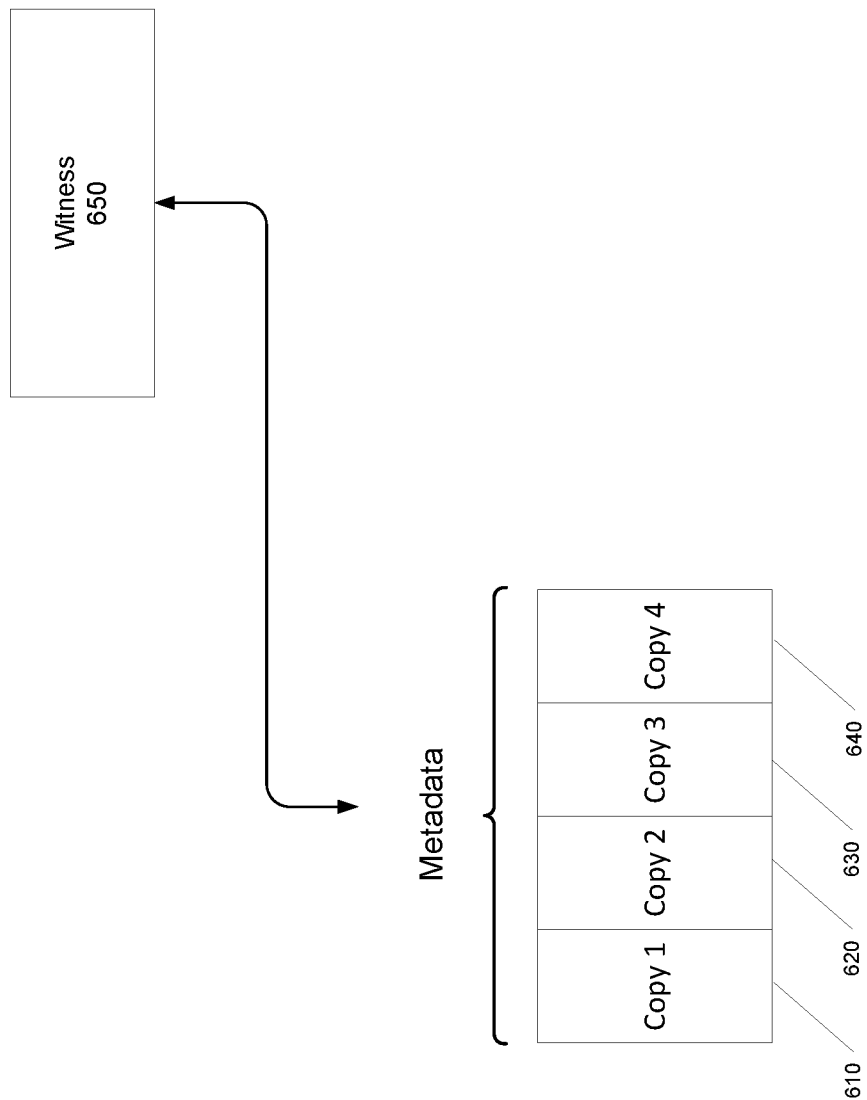
FIG. 6 is a diagram illustrating an example of a metadata drive resiliency scheme, according to the described implementations.
Figure 7:
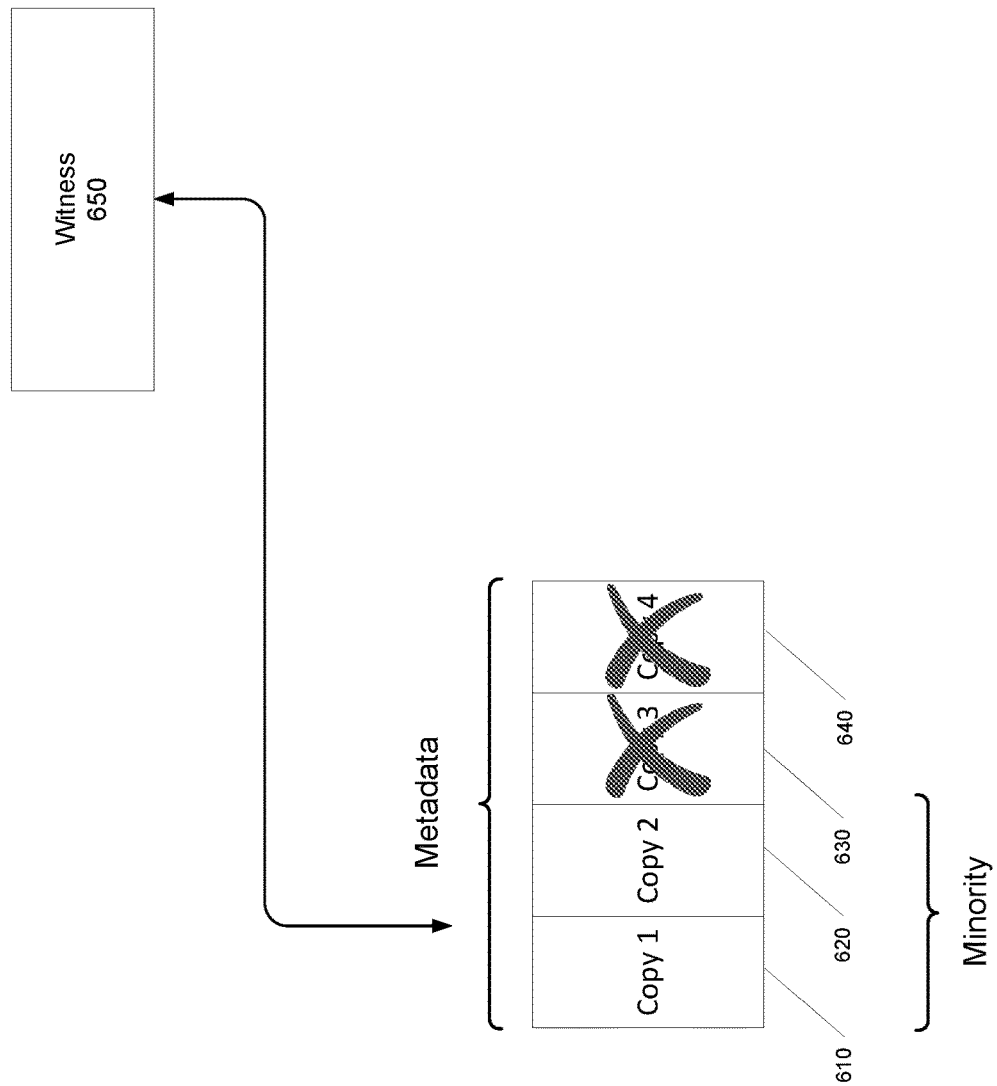
FIG. 7 is a diagram illustrating an example of a metadata drive resiliency scheme, according to the described implementations.

Referring to FIG. 6, illustrated is an example showing disks 610, 620, 630, and 640 that are configured to store metadata for a storage layout. An additional witness voter 650 may be configured to be activated and updated with the latest layout information. During the lifetime of the storage space, some of the metadata data stores may fail. The resiliency scheme for the metadata should ensure sufficient redundancy to enable data integrity and recovery and allow the metadata to be trusted. The timing of the activation of the witness may thus be determined based on when the witness disk is needed, for example when two copies of the metadata are unavailable and the witness is needed to form a majority. For example, FIG. 7 illustrates a scenario where metadata disks 630 and 640 are no longer available. Disks 610 and 620 comprise 50% of the total number of metadata disks, and thus the witness data 650 may be invoked to maintain a quorum.

In some embodiments, the operation of the quorum can be redefined to allow for the metadata to be trusted even when the number of valid metadata voters fall below 50%. As long as the node witness was present to witness a transaction, the metadata reported by the witness may be considered to be valid. To ensure that the witness's recollection of events is valid when the total number of metadata copies dips below 50%, the witness may be engaged earlier (e.g., invoked before the total number of metadata copies dips below 50%). In one embodiment, a range of valid numbers of metadata voters may be used to trigger the activation of the witness. For example, if there are six metadata voters, normally four or more metadata voters would be needed for a majority. In this case, the majority case may be defined as any number of metadata voters from 2 to 4 out of the 6 metadata drives. When the number of metadata voters reaches 4, the witness may be engaged so that the metadata reported by the witness is still valid. Thus, by the time two or three metadata voters is reached, the witness has been updated with a reliable copy of metadata.

This is advantageous because it is desirable for performance to avoid writing to the witness continuously until the witness is actually needed. In particular, writing to the witness takes time and resources. Therefore, if it is not necessary to invoke the witness, performance may be improved by not incurring the additional writes to the witness.

Figure 8:
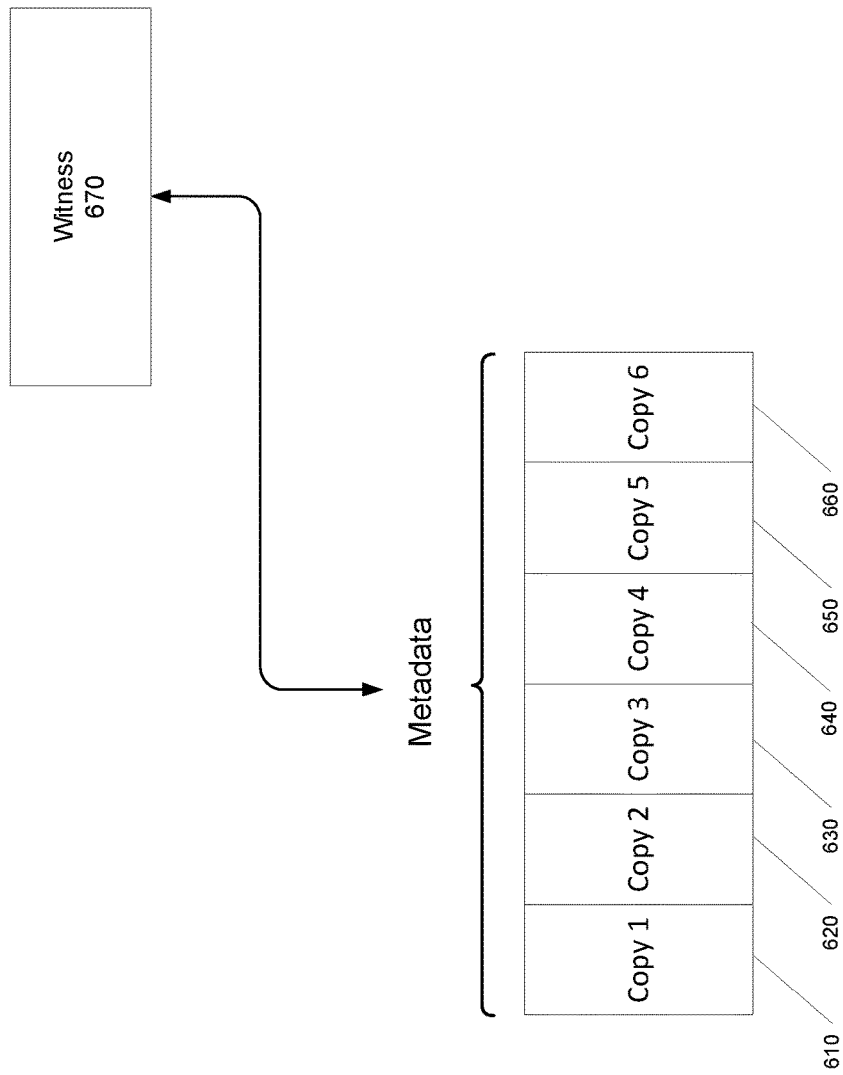
FIG. 8 is a diagram illustrating an example of a metadata drive resiliency scheme, according to the described implementations.
Figure 9:
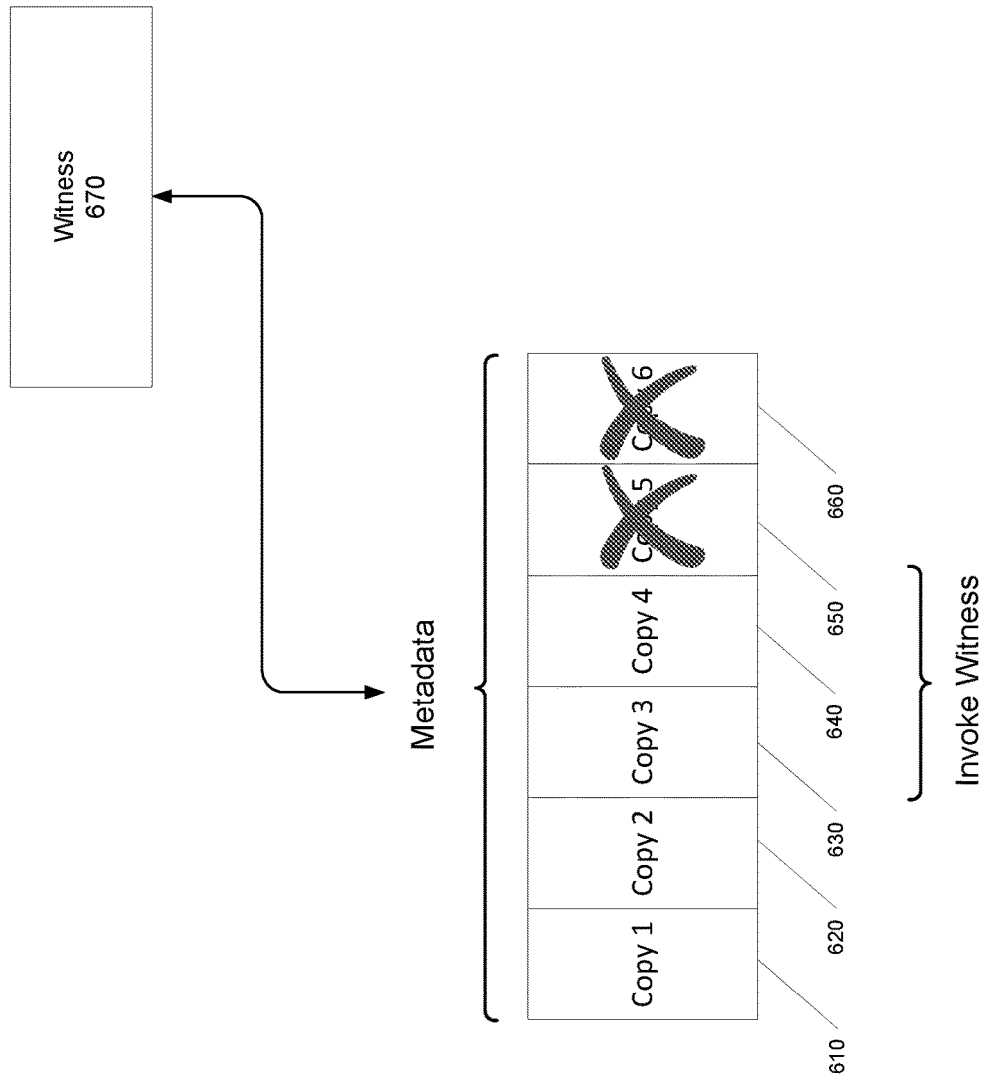
FIG. 9 is a diagram illustrating an example of a metadata drive resiliency scheme, according to the described implementations.

Referring to FIG. 8, illustrated is one example where six copies of the metadata are maintained on disks 610, 620, 630, 640, 650, and 660. In an embodiment, the witness 670 may be invoked when two of the six metadata voters become unavailable. Referring to FIG. 9, metadata voters 650 and 660 are shown as being unavailable. The witness may be invoked at this point and may continue to be activated while up to two additional metadata voters become unavailable. When a third metadata voter becomes unavailable, the three remaining voters plus the witness can form a quorum of four voters. If a further metadata voter becomes unavailable, the two remaining voters plus the witness can form a quorum consisting of three voters, which in one embodiment may be considered as having sufficient integrity for the metadata contained therein. This allows for operation to continue even with the loss of four of the six voters.

In one embodiment, two metadata voters may be implemented per node of stored data. Thus, for a network with 4 nodes, a total of 8 metadata voters may be implemented. The increased quorum range where the metadata can be trusted can thus be expanded to 4+/−2 metadata voters.

More generally, the desired number of metadata voters can be 50% plus the number of metadata voter failures that are to be absorbed. This can be defined as the number of node failures plus the number of additional drive failures that are to be absorbed. In an embodiment, the metadata stored at the witness storage device may be updated when the number of available mirrored copies of the metadata reaches N/2+T, where N is the total number of mirrored copies and T is the number of additional mirrored copy failures beyond 50% that are to be absorbed. The data contained in the witness storage device may be used to maintain valid mirrored copies when the number of mirrored copies is (N/2)−T or more.

The overall resiliency of a storage network can thus be increased by using a multilevel resiliency for the stored data and using a witness to maintain integrity of the metadata.

Figure 10:
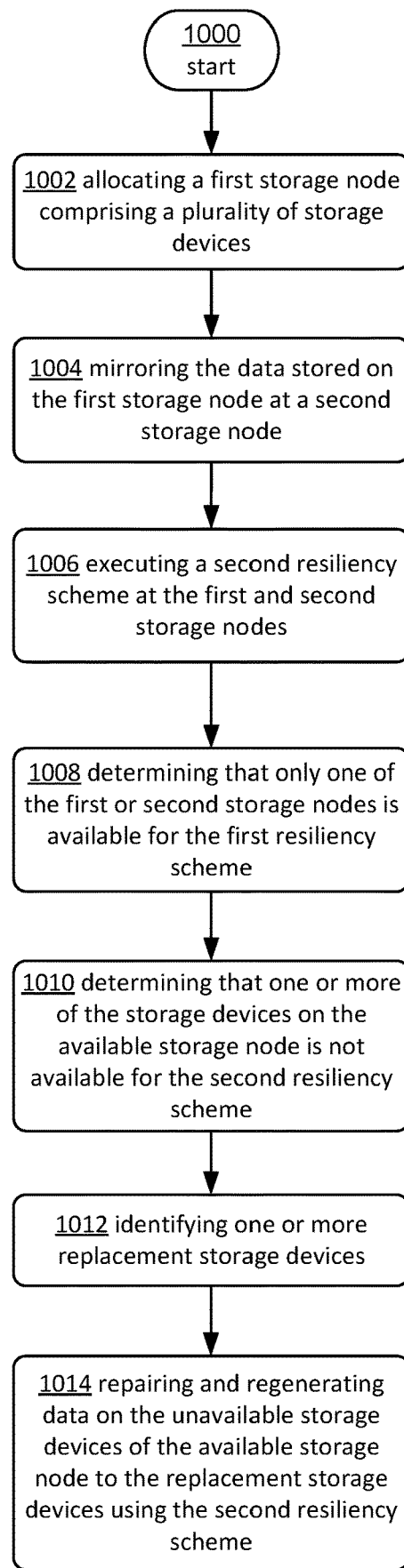
FIG. 10 is a diagram illustrating an example operational procedure, according to the described implementations.

Referring to FIG. 10, illustrated is an example operational procedure in accordance with the present disclosure. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by modules running the features disclosed herein and can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine may be also implemented in many other ways. For example, the routine may be implemented, at least in part, by a processor of another remote computer or a local circuit. In addition, one or more of the operations of the routine may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Referring to FIG. 10, Operation 1000 begins the procedure. Operation 1000 may be followed by Operation 1002. Operation 1002 illustrates allocating a first storage node configured to store data that is to be stored using a first resiliency scheme. In an embodiment, the first storage node comprises a plurality of storage devices. Operation 1002 may be followed by Operation 1004. Operation 1004 illustrates mirroring the data stored on the first storage node at a second storage node configured to provide a mirrored copy of the first storage node. In an embodiment, the second storage node comprises a plurality of storage devices. Operation 1004 may be followed by Operation 1006. Operation 1006 illustrates executing a second resiliency scheme at each of the first and second storage nodes. In an embodiment, the second resiliency scheme is configured to allow data on at least one of the storage devices of the first and second storage nodes to be available when a device failure occurs within the first or second storage nodes. Operation 1006 may be followed by Operation 1008. Operation 1008 illustrates determining that only one of the first or second storage nodes is available for the first resiliency scheme.

Operation 1008 may be followed by operation 1010. Operation 1010 illustrates determining that one or more of the storage devices on the available storage node is not available for the second resiliency scheme. Operation 1010 may be followed by operation 1012. Operation 1012 illustrates identifying one or more replacement storage devices. Operation 1012 may be followed by operation 1014. Operation 1014 illustrates repairing and regenerating data on the unavailable storage devices of the available storage node to the replacement storage devices using the second resiliency scheme.

Figure 11:
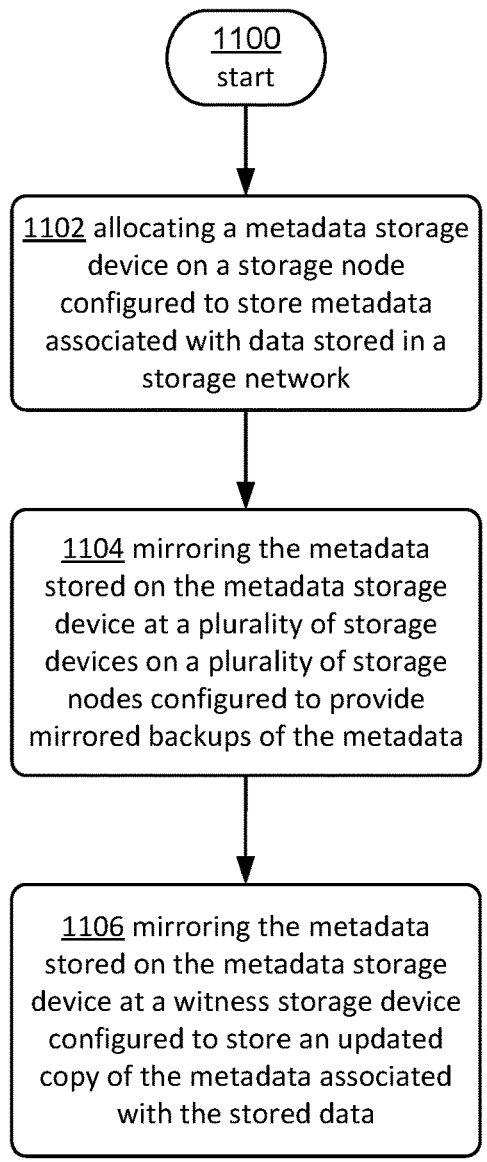
FIG. 11 is a diagram illustrating an example operational procedure, according to the described implementations.

Referring to FIG. 11, illustrated is an example operational procedure in accordance with the present disclosure. Referring to FIG. 11, Operation 1100 begins the procedure. Operation 1100 may be followed by Operation 1102. Operation 1102 illustrates allocating a metadata storage device on a storage node configured to store metadata associated with data stored in a storage network. In an embodiment, the metadata includes a record of data writes and associated resiliency backups. Operation 1102 may be followed by Operation 1104. Operation 1104 illustrates mirroring the metadata stored on the metadata storage device at a plurality of storage devices on a plurality of storage nodes configured to provide mirrored copies of the metadata. Operation 1104 may be followed by Operation 1106. Operation 1106 illustrates mirroring the metadata stored on the metadata storage device at a witness storage device configured to store an updated copy of the metadata associated with the stored data. In an embodiment, the witness storage device is used to maintain a majority number of mirrored copies of the metadata.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the described methods are described herein as being implemented, at least in part, by system components, which can comprise an application, component and/or a circuit. In some configurations, the system components include a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of FIG. 1-10, it can be appreciated that the operations of the described methods may be also implemented in many other ways. For example, the methods may be implemented, at least in part, by a processor of another remote computer or a local circuit. In addition, one or more of the operations of the methods may alternatively or additionally be implemented, at least in part, by a chipset working alone or in conjunction with other software modules. Any service, circuit or application suitable for providing the techniques disclosed herein can be used in operations described herein.

Figure 12:
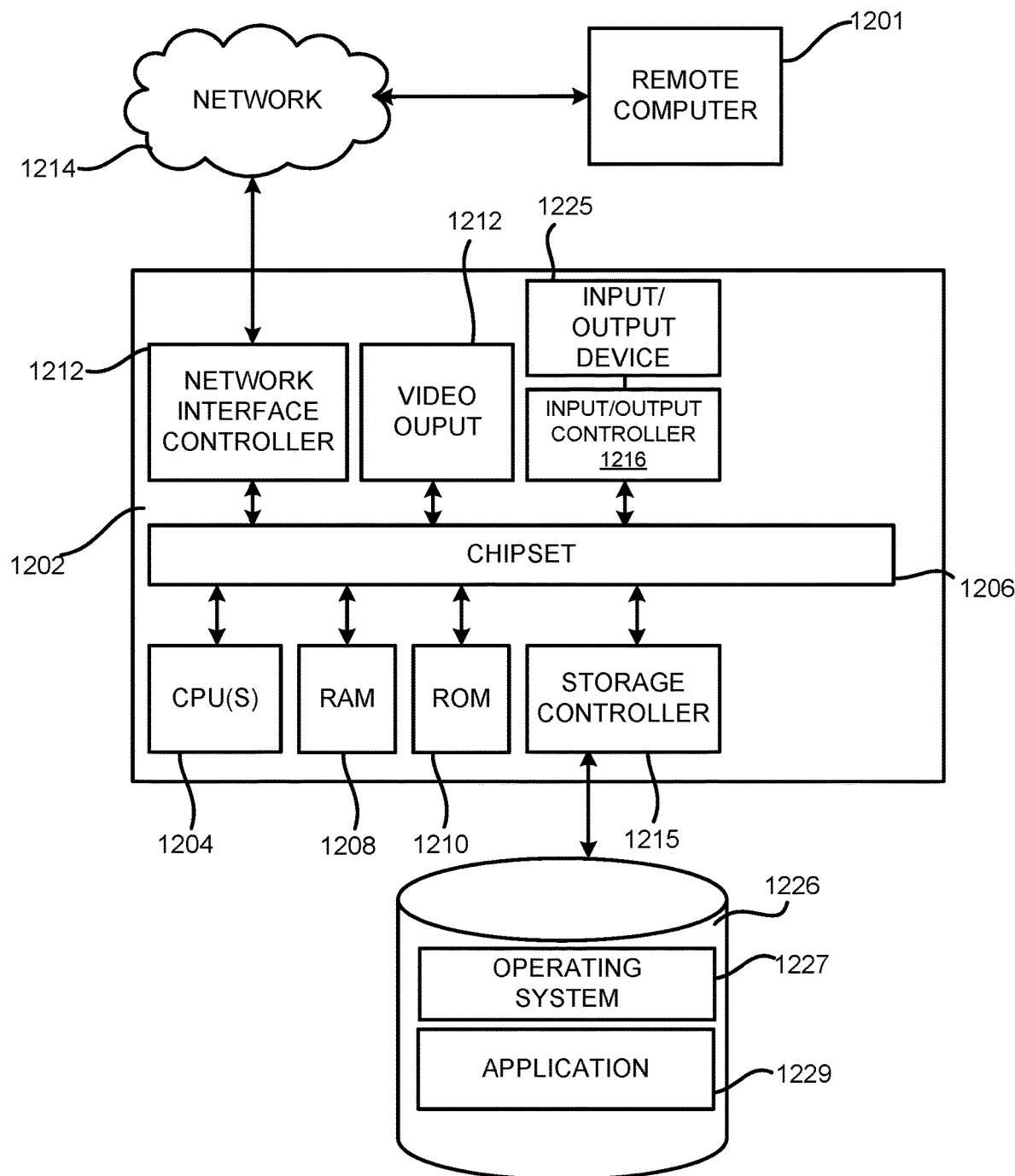
FIG. 12 is a computer architecture diagram illustrating a computing device architecture for a computing device capable of implementing aspects of the techniques and technologies presented herein.

FIG. 12 shows additional details of an example computer architecture capable of various aspects of the embodiments described above. The computer architecture shown in FIG. 12 illustrates aspects of a system, such as a conventional server computer, workstation, desktop computer, laptop, tablet, computing or processing systems embedded in devices (such as wearables, automobiles, home automation etc.), or other computing device, and may be utilized to execute any of the software components presented herein. For example, the computer architecture shown in FIG. 12 may be utilized to execute any of the software components described above.

The computer architecture includes a baseboard 1202, or "motherboard," which is a printed circuit board to which a multitude of components or devices may be connected by way of a system bus or other electrical communication paths. In one illustrative embodiment, one or more central processing units ("CPUs") 1204 operate in conjunction with a chipset 1206. The CPUs 1204 may be standard programmable processors that perform arithmetic and logical operations necessary for the operation of the computer architecture.

The CPUs 1204 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 may provide an interface to a RAM 1208, used as the main memory in the computer architecture. The chipset 1206 may further provide an interface to a computer-readable storage medium such as a read-only memory ("ROM") 1210 or non-volatile RAM ("NVRAM") for storing basic routines that help to startup the computing device and to transfer information between the various components and devices. The ROM 1210 or NVRAM may also store other software components necessary for the operation of the computer architecture in accordance with the embodiments described herein.

The computer architecture may operate in a networked environment using logical connections to remote computing devices and computer systems through a network 1214, such as the local area network. The chipset 1206 may include functionality for providing network connectivity through a network interface controller (NIC) 1212, such as a gigabit Ethernet adapter. The NIC 1212 is capable of connecting the computer architecture to other computing devices over the network 1214. It should be appreciated that multiple NICs 1212 may be present in the computer architecture, connecting the computer to other types of networks and remote computer systems. The network allows the computer architecture to communicate with remote services and servers, such as the remote computer 1201. As can be appreciated, the remote computer 1201 may host a number of services such as the XBOX LIVE gaming service provided by MICROSOFT CORPORATION of Redmond, Wash. In addition, as described above, the remote computer 1201 may mirror and reflect data stored on the computer architecture and host services that may provide data or processing for the techniques described herein.

The computer architecture may be connected to a mass storage device 1226 that provides non-volatile storage for the computing device. The mass storage device 1226 may store system programs, application programs, other program modules, and data, which have been described in greater detail herein. The mass storage device 1226 may be connected to the computer architecture through a storage controller 1215 connected to the chipset 1206. The mass storage device 1226 may consist of one or more physical storage units. The storage controller 1215 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 1226, other storage media and the storage controller 1215 may include MultiMediaCard (MMC) components, eMMC components, Secure Digital (SD) components, PCI Express components, or the like.

The computer architecture may store data on the mass storage device 1226 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1226 is characterized as primary or secondary storage, and the like.

For example, the computer architecture may store information to the mass storage device 1226 by issuing instructions through the storage controller 1215 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture may further read information from the mass storage device 1226 by detecting the physical states or characteristics of one or more particular locations within the physical storage units.

In addition to the mass storage device 1226 described above, the computer architecture may have access to other computer-readable media to store and retrieve information, such as program modules, data structures, or other data. As the operating system 1227, the application 1229, other data and other modules are depicted as data and software stored in the mass storage device 1226, it should be appreciated that these components and/or other modules may be stored, at least in part, in other computer-readable storage media of the computer architecture. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium," "computer-readable storage medium," and variations thereof, does not include waves or signals per se and/or communication media.

The mass storage device 1226 may store an operating system 1227 utilized to control the operation of the computer architecture. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 1226 may store other system or application programs and data utilized by the computer architecture, such as any of the other software components and data described above. The mass storage device 1226 might also store other programs and data not specifically identified herein.

In one embodiment, the mass storage device 1226 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 1204 transition between states, as described above. According to one embodiment, the computer architecture has access to computer-readable storage media storing computer-executable instructions which, when executed by the computer architecture, perform the various routines described above with regard to FIG. 12, and the other FIGURES. The computing device might also include computer-readable storage media for performing any of the other computer-implemented operations described herein.

The computer architecture may also include one or more input/output controllers 1216 for receiving and processing input from a number of input devices, such as a keyboard, a mouse, a microphone, a headset, a touchpad, a touch screen, an electronic stylus, image processing and gesture recognition devices, or any other type of input device. The input/output controller 1216 is in communication with an input/output device 1225. The input/output controller 1216 may provide output to a display, such as a computer monitor, a flat-panel display, a digital projector, a printer, a plotter, or other type of output device. The input/output controller 1216 may provide input communication with other devices such as a microphone, a speaker, game controllers and/or audio devices.

For example, the input/output controller 1216 can be an encoder and the input/output device 1225 can include a full speaker system having a plurality of speakers. The encoder can use a spatialization technology, and the encoder can process audio output audio or output signals received from the application 1212. The encoder can utilize a selected spatialization technology to generate a spatially encoded stream that appropriately renders to the input/output device 1225.

The disclosure presented herein may be considered in view of the following clauses.

Example Clause A, a computer-implemented method for storing data in a storage system, the method comprising:

allocating a first storage node configured to store data that is to be stored using a first resiliency scheme, the first storage node comprising a plurality of storage devices;

mirroring the data stored on the first storage node at a second storage node configured to provide a mirrored copy of the first storage node, the second storage node comprising a plurality of storage devices;

executing a second resiliency scheme at each of the first and second storage nodes, wherein the second resiliency scheme is configured to allow data on at least one of the storage devices of the first and second storage nodes to be available when a device failure occurs within the first or second storage nodes;

determining that only one of the first or second storage nodes is available for the first resiliency scheme;

determining that one or more of the storage devices on the available storage node is not available for the second resiliency scheme;

identifying one or more replacement storage devices; and repairing and regenerating data on the unavailable storage devices of the available storage node to the replacement storage devices using the second resiliency scheme.

Example Clause B, the computer-implemented method of Example Clause A, wherein the second resiliency scheme is mirroring or parity.

Example Clause C, the computer-implemented method of any one of Example Clauses A through B, further comprising implementing additional levels of resiliency.

Example Clause D, the computer-implemented method of any one of Example Clauses A through C, further comprising:

mirroring the data stored on the first storage node at a plurality of storage nodes configured to provide mirrored copies of the first storage node, the plurality of storage nodes each comprising a plurality of storage devices;

executing the second resiliency scheme at the plurality of storage nodes; and in response to a loss of availability of all but one of the plurality of storage nodes and a loss of availability of one or more storage devices on an available storage node, recovering data on the unavailable storage devices of the available storage node using the second resiliency scheme.

Example Clause E, the computer-implemented method of any one of Example Clauses A through D, further comprising:

allocating a metadata storage device on a storage node configured to store metadata associated with stored data associated with a user, the metadata including a record of data writes and associated resiliency copies;

mirroring the metadata stored on the metadata storage device at a plurality of storage devices on a plurality of storage nodes configured to provide mirrored copies of the metadata; and mirroring the metadata stored on the metadata storage device at a witness storage device configured to store an updated copy of the metadata associated with the stored data, wherein the witness storage device is used to maintain a majority number of mirrored copies of the metadata.

Example Clause F, the computer-implemented method of any one of Example Clauses A through E, further comprising:

in response to a loss of availability of a number of the plurality of storage devices on a plurality of storage nodes configured to provide mirrored backups of the metadata such that a number of available mirrored copies of the metadata is equal to or less than N/2 where N is the total number of mirrored copies; and using the data contained in the witness storage device to maintain a majority number of mirrored copies of the metadata.

Example Clause G, the computer-implemented method of any one of Example Clauses A through F, further comprising updating the metadata stored at the witness storage device when the number of available mirrored copies of the metadata reaches N/2+T where N is the total number of mirrored copies and T is the number of additional mirrored copy failures beyond 50% that are to be absorbed.

Example Clause H, the computer-implemented method of any one of Example Clauses A through G, further comprising using the data contained in the witness storage device to maintain validate mirrored copies when the number of mirrored copies is 2 or more.

Example Clause I, the computer-implemented method of any one of Example Clauses A through H, further comprising using the data contained in the witness storage device to maintain valid mirrored copies when the number of mirrored copies is (N/2)–T or more.

Example Clause J, a computing device comprising:

one or more processors;

a memory in communication with the one or more processors, the memory having computer-readable instructions stored thereupon which, when executed by the one or more processors, cause the computing device perform operations comprising:

storing data at a first storage node comprising a plurality of storage devices;

mirroring the data stored at the first storage node at least at a second storage node comprising a plurality of storage devices;

executing an additional resiliency scheme at the first and second storage nodes, wherein the resiliency additional scheme is configured to restore data when one or more of a plurality of storage devices within the first and second storage nodes becomes unavailable;

determining that only one of the first or second storage nodes is available;

determining that one or more of the storage devices on the available storage node is not available for the additional resiliency scheme;

identifying one or more replacement storage devices; and allowing data stored on the unavailable storage devices of the available storage node to be accessed using the additional resiliency scheme.

Example Clause K, the computing device of Example Clause J, wherein the data stored at the first storage node is backed at least at a second storage node using mirroring.

Example Clause L, the computing device of any one of Example Clauses J through K, wherein the data stored at the first storage node is backed at least using parity.

Example Clause M, the computing device of any one of Example Clauses J through L, wherein the additional resiliency scheme is mirroring.

Example Clause N, the computing device of any one of Example Clause J through M, wherein the additional resiliency scheme is parity.

Example Clause O, the computing device of any one of Example Clauses J through N, further comprising computer-readable instructions stored thereupon which, when executed by the one or more processors, cause the computing device perform operations comprising:

mirroring the data stored on the first storage node at a plurality of storage nodes configured to provide copies of the first storage node, the plurality of storage nodes each comprising a plurality of storage devices;

executing the additional resiliency scheme at the plurality of storage nodes; and in response to a loss of availability of all but one of the plurality of storage nodes and a loss of availability of one or more storage devices on the available storage node, recovering data on the unavailable storage devices of the available storage node using the additional resiliency scheme.

Example Clause P, the computing device of any one of Example Clauses J through O, further comprising computer-readable instructions stored thereupon which, when executed by the one or more processors, cause the computing device perform operations comprising:

allocating a metadata storage device on a storage node configured to store metadata associated with the stored data, the metadata including a record of data writes and associated resiliency copies;

mirroring the metadata stored on the metadata storage device at a plurality of storage devices on a plurality of storage nodes configured to provide copies of the metadata; and mirroring the metadata stored on the metadata storage device at a witness storage device configured to store an updated copy of the metadata associated with the stored data, wherein the witness storage device is used to maintain a majority number of copies of the metadata.

Example Clause Q, the computing device of any one of Example Clauses J through P, further comprising computer-readable instructions stored thereupon which, when executed by the one or more processors, cause the computing device perform operations comprising:

in response to a loss of availability of a number of the plurality of storage devices on a plurality of storage nodes configured to provide mirrored copies of the metadata such that a number of available mirrored copies of the metadata is equal to or less than N/2 where N is the total number of mirrored copies:

using the data contained in the witness storage device to maintain a majority number of mirrored copies of the metadata storage node.

Example Clause R, a computer-implemented method for storing data in a storage system, the method comprising:

allocating a metadata storage device on a storage node configured to store metadata associated with data stored in a storage network, the metadata including a record of data writes and associated resiliency backups;

mirroring the metadata stored on the metadata storage device at a plurality of storage devices on a plurality of storage nodes configured to provide mirrored copies of the metadata; and mirroring the metadata stored on the metadata storage device at a witness storage device configured to store an updated copy of the metadata associated with the stored data, wherein the witness storage device is used to maintain a majority number of mirrored copies of the metadata.

Example Clause S, the computer-implemented method of Example R, further comprising:

in response to a loss of availability of a number of the plurality of storage devices on a plurality of storage nodes configured to provide mirrored copies of the metadata such that a number of available mirrored copies of the metadata is equal to or less than N/2 where N is the total number of mirrored copies:

using the data contained in the witness storage device to maintain a majority number of mirrored copies of the metadata.

Example Clause T, the computer-implemented method of any one of Example Clauses R through S, further comprising updating the metadata stored at the witness storage device when the number of mirrored copies of the metadata reaches N/2+T where N is the total number of mirrored backups and T is the number of additional mirrored copy failures beyond 50% that are to be absorbed.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for storing data in a storage system, the method comprising:
    allocating a metadata storage device on a storage node configured to store metadata associated with data stored in a storage network, the metadata including a record of data writes and associated resiliency backups;
    mirroring the metadata stored on the metadata storage device at a plurality of storage devices on a plurality of storage nodes configured to provide mirrored copies of the metadata; and
    mirroring the metadata stored on the metadata storage device at a witness storage device configured to store an updated copy of the metadata associated with the stored data, wherein the witness storage device is used to maintain a majority number of mirrored copies of the metadata.

2. The computer-implemented method of claim 1, further comprising:
    in response to a loss of availability of a number of the plurality of storage devices on a plurality of storage nodes configured to provide mirrored copies of the metadata such that a number of available mirrored copies of the metadata is equal to or less than N/2 where N is the total number of mirrored copies:
    using the data contained in the witness storage device to maintain a majority number of mirrored copies of the metadata.

3. The computer-implemented method of claim 1, further comprising updating the metadata stored at the witness storage device when the number of mirrored copies of the metadata reaches N/2+T where N is the total number of mirrored backups and T is the number of additional mirrored copy failures beyond 50% that are to be absorbed.

4. A computing device comprising:
    one or more processors;
    a memory in communication with the one or more processors, the memory having computer-readable instructions stored thereupon which, when executed by the one or more processors, cause the computing device to perform operations comprising:
    allocating a metadata storage device on a storage node configured to store metadata associated with data stored in a storage network, the metadata including a record of data writes and associated resiliency backups;
    mirroring the metadata stored on the metadata storage device at a plurality of storage devices on a plurality of storage nodes configured to provide mirrored copies of the metadata; and
    mirroring the metadata stored on the metadata storage device at a witness storage device configured to store an updated copy of the metadata associated with the stored data, wherein the witness storage device is used to maintain a majority number of mirrored copies of the metadata.

5. The computing device of claim 4, further comprising computer-readable instructions stored thereupon which, when executed by the one or more processors, cause the computing device to perform operations comprising:
    in response to a loss of availability of a number of the plurality of storage devices on a plurality of storage nodes configured to provide mirrored copies of the metadata such that a number of available mirrored copies of the metadata is equal to or less than N/2 where N is the total number of mirrored copies:
    using the data contained in the witness storage device to maintain a majority number of mirrored copies of the metadata.

6. The computing device of claim 4, further comprising computer-readable instructions stored thereupon which, when executed by the one or more processors, cause the computing device to perform operations comprising:
    updating the metadata stored at the witness storage device when the number of mirrored copies of the metadata reaches N/2+T where N is the total number of mirrored backups and T is the number of additional mirrored copy failures beyond 50% that are to be absorbed.

7. The computing device of claim 6, further comprising computer-readable instructions stored thereupon which, when executed by the one or more processors, cause the computing device to perform operations comprising:
    using the data contained in the witness storage device to maintain valid mirrored copies when the number of mirrored copies is 2 or more.

8. The computing device of claim 6, further comprising computer-readable instructions stored thereupon which, when executed by the one or more processors, cause the computing device to perform operations comprising:
    using the data contained in the witness storage device to maintain valid mirrored copies when the number of mirrored copies is (N/2)−T or more.

9. The computing device of claim 4, further comprising computer-readable instructions stored thereupon which, when executed by the one or more processors, cause the computing device to perform operations comprising:
    allocating a first storage node configured to store data that is to be stored using a first resiliency scheme, the first storage node comprising a plurality of storage devices;
    mirroring the data stored on the first storage node at a second storage node configured to provide a mirrored copy of the first storage node, the second storage node comprising a plurality of storage devices;
    executing a second resiliency scheme at each of the first and second storage nodes, wherein the second resiliency scheme is configured to allow data on at least one of the storage devices of the first and second storage nodes to be available when a device failure occurs within the first or second storage nodes;
    determining that only one of the first or second storage nodes is available for the first resiliency scheme;
    determining that one or more of the storage devices on the available storage node is not available for the second resiliency scheme;
    identifying one or more replacement storage devices; and repairing and regenerating data on the unavailable storage devices of the available storage node to the replacement storage devices using the second resiliency scheme.

10. The computing device of claim 9, wherein the second resiliency scheme is mirroring or parity.

11. The computing device of claim 9, further comprising computer-readable instructions stored thereupon which, when executed by the one or more processors, cause the computing device to perform operations comprising:
implementing additional levels of resiliency.

12. The computing device of claim 9, further comprising computer-readable instructions stored thereupon which, when executed by the one or more processors, cause the computing device to perform operations comprising:
mirroring the data stored on the first storage node at a plurality of storage nodes configured to provide mirrored copies of the first storage node, the plurality of storage nodes each comprising a plurality of storage devices;
executing the second resiliency scheme at the plurality of storage nodes; and
in response to a loss of availability of all but one of the plurality of storage nodes and a loss of availability of one or more storage devices on an available storage node, recovering data on the unavailable storage devices of the available storage node using the second resiliency scheme.

13. A computer-readable storage medium having computer-readable instructions stored thereupon which, when executed by one or more processors of a computing system, cause the computing system to perform operations comprising:
allocating a metadata storage device on a storage node configured to store metadata associated with data stored in a storage network, the metadata including a record of data writes and associated resiliency backups;
mirroring the metadata stored on the metadata storage device at a plurality of storage devices on a plurality of storage nodes configured to provide mirrored copies of the metadata; and
mirroring the metadata stored on the metadata storage device at a witness storage device configured to store an updated copy of the metadata associated with the stored data, wherein the witness storage device is used to maintain a majority number of mirrored copies of the metadata.

14. The computer-readable storage medium of claim 13, further comprising computer-readable instructions stored thereupon which, when executed by one or more processors of a computing system, cause the computing system to perform operations comprising:
in response to a loss of availability of a number of the plurality of storage devices on a plurality of storage nodes configured to provide mirrored copies of the metadata such that a number of available mirrored copies of the metadata is equal to or less than N/2 where N is the total number of mirrored copies:
using the data contained in the witness storage device to maintain a majority number of mirrored copies of the metadata.

15. The computer-readable storage medium of claim 13, further comprising computer-readable instructions stored thereupon which, when executed by one or more processors of a computing system, cause the computing system to perform operations comprising:
updating the metadata stored at the witness storage device when the number of mirrored copies of the metadata reaches N/2+T where N is the total number of mirrored backups and T is the number of additional mirrored copy failures beyond 50% that are to be absorbed.

16. The computer-readable storage medium of claim 13, further comprising computer-readable instructions stored thereupon which, when executed by one or more processors of a computing system, cause the computing system to perform operations comprising:
storing data at a first storage node comprising a plurality of storage devices;
mirroring the data stored at the first storage node at least at a second storage node comprising a plurality of storage devices;
executing an additional resiliency scheme at the first and second storage nodes, wherein the additional resiliency scheme is configured to restore data when one or more of a plurality of storage devices within the first and second storage nodes becomes unavailable;
determining that only one of the first or second storage nodes is available;
determining that one or more of the storage devices on the available storage node is not available for the additional resiliency scheme;
identifying one or more replacement storage devices; and
allowing data stored on the unavailable storage devices of the available storage node to be accessed using the additional resiliency scheme.

17. The computer-readable storage medium of claim 16, wherein the data stored at the first storage node is backed at least at a second storage node using mirroring.

18. The computer-readable storage medium of claim 16, wherein the data stored at the first storage node is backed at least using parity.

19. The computer-readable storage medium of claim 16, wherein the additional resiliency scheme is mirroring or parity.

20. The computer-readable storage medium of claim 16, further comprising computer-readable instructions stored thereupon which, when executed by the one or more processors, cause the computing system to perform operations comprising:
mirroring the data stored on the first storage node at a plurality of storage nodes configured to provide copies of the first storage node, the plurality of storage nodes each comprising a plurality of storage devices;
executing the additional resiliency scheme at the plurality of storage nodes; and
in response to a loss of availability of all but one of the plurality of storage nodes and a loss of availability of one or more storage devices on the available storage node, recovering data on the unavailable storage devices of the available storage node using the additional resiliency scheme.

* * * * *